United States Patent
Sundrla (10) Patent No.: US 10,088,060 B2
(45) Date of Patent: Oct. 2, 2018

(54) SHUT-OFF DEVICE

(71) Applicant: Thad Paul Sundrla, Drake, CO (US)

(72) Inventor: Thad Paul Sundrla, Drake, CO (US)

( * ) Notice: Subject to any disclaimer, the term of this patent is extended or adjusted under 35 U.S.C. 154(b) by 0 days.

(21) Appl. No.: 15/143,872

(22) Filed: May 2, 2016

(65) Prior Publication Data

US 2016/0327198 A1 Nov. 10, 2016

Related U.S. Application Data

(60) Provisional application No. 62/157,170, filed on May 5, 2015.

(51) Int. Cl.
| | |
|---|---|
| *F16L 55/18* | (2006.01) |
| *F16K 3/30* | (2006.01) |
| *F16K 3/02* | (2006.01) |
| *F16K 31/50* | (2006.01) |
| *F16L 55/105* | (2006.01) |
| *F16K 27/04* | (2006.01) |

(52) U.S. Cl.
CPC ............. *F16K 3/30* (2013.01); *F16K 3/0281* (2013.01); *F16K 27/044* (2013.01); *F16K 31/504* (2013.01); *F16L 55/105* (2013.01)

(58) Field of Classification Search
CPC .......... F16K 3/30; F16K 3/0281; F16L 41/06; F16L 55/105
USPC ....................................... 137/318, 320, 322
See application file for complete search history.

(56) References Cited

U.S. PATENT DOCUMENTS

| | | | | |
|---|---|---|---|---|
| 2,001,271 A | * | 5/1935 | Smith | F16K 3/30 137/240 |
| 3,227,011 A | * | 1/1966 | Larry | F16L 55/105 137/318 |
| 3,532,113 A | * | 10/1970 | McKean | F16K 3/02 137/318 |
| 3,650,547 A | * | 3/1972 | Tickett | F16L 25/028 137/318 |
| 3,687,166 A | | 8/1972 | Herrin | |
| 3,749,108 A | * | 7/1973 | Long | F16L 55/105 137/15.17 |
| 3,766,979 A | | 10/1973 | Petrick | |

(Continued)

OTHER PUBLICATIONS

"Search Report and Written Opinion of the International Searching Authority" dated Sep. 23, 2016 issued in co-owned PCT Patent Application No. PCT/US16/30955 of Thad Paul Sundrla, 12 pages.

*Primary Examiner* — Reinaldo Sanchez-Medina
(74) *Attorney, Agent, or Firm* — Trenner Law Firm, LLC; Mark D. Trenner (57) ABSTRACT

An example shut-off device includes an upper valve body, and a lower valve body. The lower valve body connects to the upper valve body to surround a section of a pipe to form a chamber therein. A cutting blade in the chamber is tightening against the pipe to cut through the pipe and at least partially seal an opening in the cut pipe. Following a repair to the pipe, the cutting blade may be operated as a gate valve, opening to permit fluid flow through the pipe, and closing to at least partially restrict or fully stop fluid flow through the pipe. Also disclosed is an emergency repair for a pipe including a sleeve housing configured to be opened and closed around a portion of a pipe to be repaired, and a tightening mechanism configured to reduce an inner diameter and tighten against the pipe to be repaired.

20 Claims, 9 Drawing Sheets

(56) References Cited

U.S. PATENT DOCUMENTS

| | | | |
|---|---|---|---|
| 3,817,271 A | | 6/1974 | Roven |
| 3,863,667 A | * | 2/1975 | Ward ................... F16L 55/105 137/318 |
| 4,177,827 A | * | 12/1979 | Smith ................... F16K 43/00 137/246.22 |
| 4,257,447 A | * | 3/1981 | Clarkson ................ F16K 3/316 137/375 |
| 4,516,593 A | | 5/1985 | Muto |
| 4,516,598 A | | 5/1985 | Stupak |
| 4,628,955 A | * | 12/1986 | Smith ................... F16L 41/06 137/318 |
| 5,063,957 A | * | 11/1991 | Yano .................... F16L 21/04 137/15.09 |
| 5,269,340 A | * | 12/1993 | Drzewiecki ........... F16L 41/065 137/318 |
| 5,430,932 A | * | 7/1995 | MacLaggan ............ F16K 43/00 29/213.1 |
| 5,611,365 A | * | 3/1997 | Maichel ................ F16L 55/105 137/15.17 |
| 5,620,020 A | | 4/1997 | Collins |
| 6,041,806 A | | 3/2000 | Maichel |
| 6,470,907 B1 | * | 10/2002 | Sato ........................ F16L 41/06 137/15.14 |
| 8,607,814 B1 | * | 12/2013 | Boltjes ................. F16L 55/105 137/318 |
| 2013/0220436 A1 | | 8/2013 | Sharp et al. |
| 2014/0021397 A1 | * | 1/2014 | Painter ................. F16K 3/0281 251/328 |

\* cited by examiner

SHUT-OFF DEVICE

CROSS REFERENCE TO RELATED APPLICATIONS

This application claims the priority benefit of U.S. Provisional Patent Application Nos. 62/157,170 filed May 5, 2015 for "Universal Post-Failure Shut-off Rescue Device," hereby incorporated by reference in its entirety as though fully set forth herein.

BACKGROUND

Pipes are commonly used in just about every home and commercial and government buildings to carry water. Pipes and other conduits are also used in many industries to carry other liquids and gases such as hydraulic lines in factories and in heavy equipment. Millions of miles of pipes and conduits are part of our aging infrastructure. Large pipelines carry oil over huge distances. Pipes and other conduits may become damaged or break due to fatigue, corrosion, exposure to elements and temperature differentials, as well as accidental or negligent damage (e.g. hitting or inadvertently cutting into or through the pipe), or due to any number of other circumstances, even intentional sabotage. When pipes break, the resulting damage, physical, environmental and often medical, from the water or other substances carried by the conduit, can be extensive.

Many products on the market today focus on preventing breakage or leaks from occurring. As none of these are fail-proof however, with many safety devices themselves suffering from fatigue and other factors diminishing their performance, breakages and leaks happen all the time. Sometimes the damages go into catastrophic proportions, depending on the size and scope of the leak, type of substance, infrastructure and distances involved, and how long it takes to shut off the source or otherwise stop the leak.

DETAILED DESCRIPTION

A shut-off device is disclosed. An example shut-off device includes an upper valve body, and a lower valve body. The lower valve body connects to the upper valve body to surround a section of a pipe to form a chamber. A cutting blade in the chamber is tightening against the pipe to cut through the pipe, and seal or at least partially seal the opening in the cut pipe. Following a repair to the pipe, the cutting blade may be operated as a gate valve, opening to permit fluid flow through the pipe, and closing to at least partially restrict or fully stop fluid flow through the pipe.

In an example, the shut-off device may be implemented as a universal post-failure shut-off rescue device. The shut-off device can be implemented to shut off a section of pipe, e.g., so that a repair can be made. The shut-off device may be operated to stop leakage and/or other spills from a conduit (also referred to herein as a "pipe") transporting a liquid or gas. The device may be operated even after all other shut-off systems (e.g., valves) have failed.

In an example, the shut-off device is assembled onto the pipe at a desired location, e.g., upstream from the damage or point of failure and then operated to cut through or sever the pipe while simultaneously closing the pipe to restrict or altogether stop flow out of the pipe. In some cases another device may be assembled onto the pipe downstream to prevent backflow.

Following repair, the shut-off device can be operated to restore normal flow in the pipe. In an example, the shut-off device can remain in place after the pipe has been repaired, and operated as a gate valve, e.g., to allow and to stop fluid flow within the pipe.

The shut-off device may be implemented to slow or even entirely stops leaks (including small leaks, spills, and even entire blowouts). The shut-off device can be implemented with any of a wide variety of different types and/or sizes of pipe, including but not limited to, hoses, waterlines, gas lines, oil pipes and pipelines, above ground, subsurface, and/or in submarine environments.

Before continuing, it is noted that as used herein, the terms "includes" and "including" mean, but are not limited to, "includes" or "including" and "includes at least" or "including at least." The term "based on" means "based on" and "based at least in part on." The term "pipe" is not limited in scope. That is, the shut-off device described herein may be used with any type or size pipe or other conduit.

Figure 1:
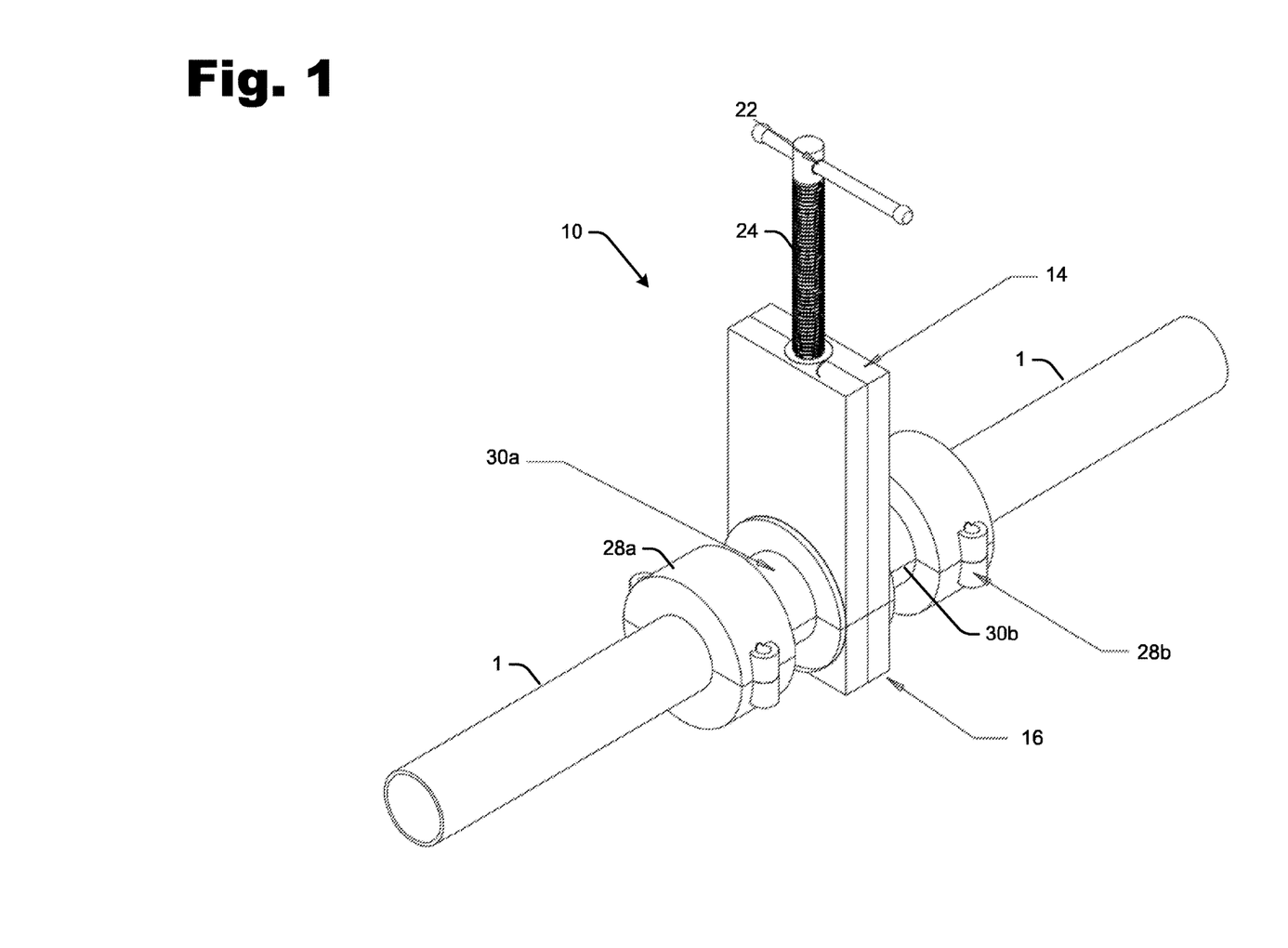
FIG. 1 is a perspective view of an example shut-off device.
Figure 2:
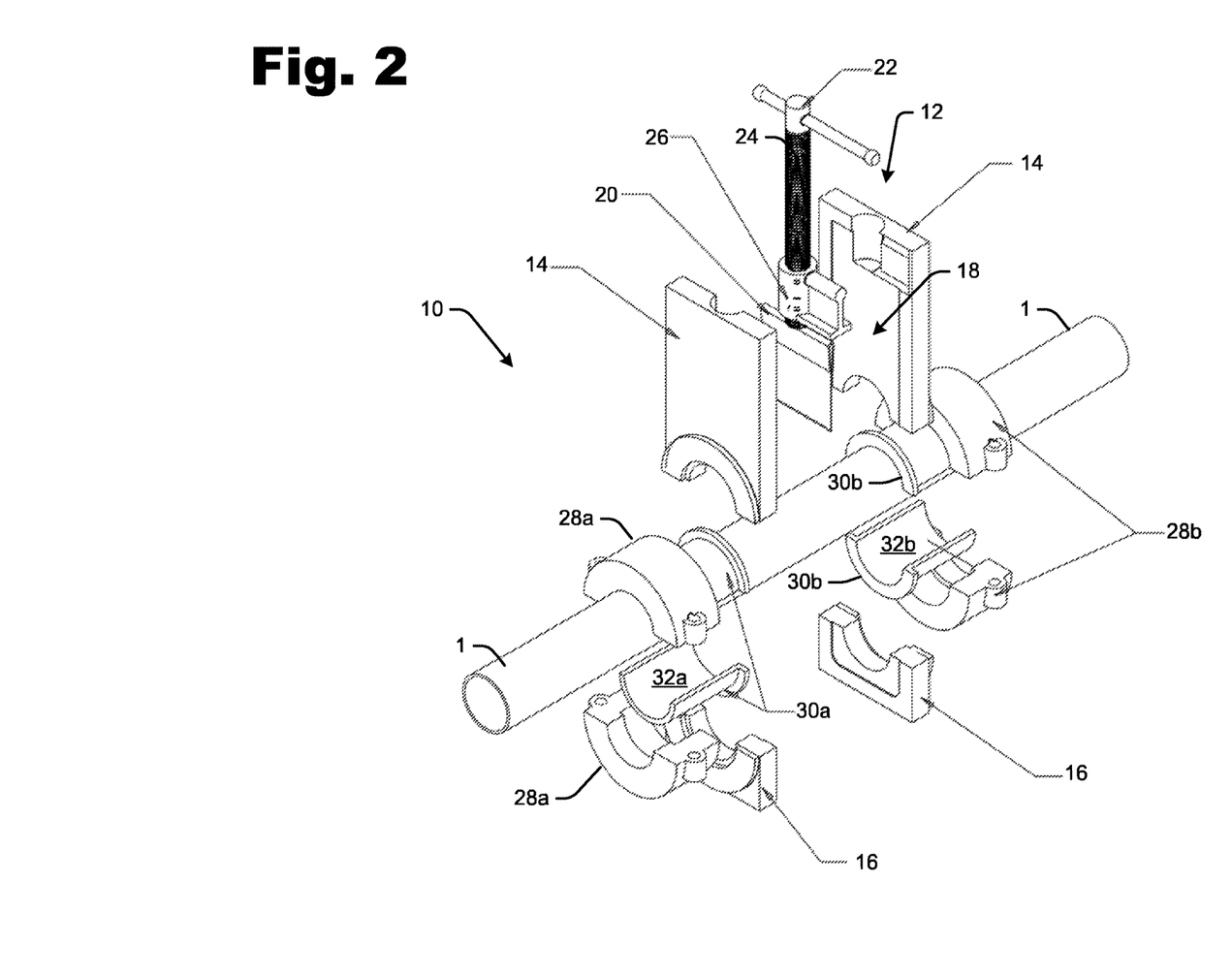
FIG. 2 is an exploded perspective view of an example shut-off device.

FIG. 1 is a perspective view of an example shut-off device 10. FIG. 2 is an exploded perspective view of the example shut-off device 10 shown in FIG. 1. It is noted that components shown in FIG. 2 are illustrated in an exploded view to better call out individual components. However, these components are not necessarily detachable. That is, multiple of the components may be formed as a single unit, such as various components of the valve housing (e.g., the upper valve body 14 and various components of the lower valve body 16). Assembly of the device will be well understood by those having ordinary skill in the art after becoming familiar with the teachings herein.

The example shut-off device 10 shown in FIGS. 1 and 2 includes a valve body 12 having an upper valve body 14, and a lower valve body 16. The lower upper body 14 and the lower valve body 16 can be assembled together around a section of a pipe 1 and form a chamber 18 (visible in FIG. 2) within the valve body 12.

A cutting blade 20 is provided in the chamber 18. In an example, the size of the cutting blade 20 is larger than twice the diameter of the pipe 1. Such a configuration enables the cutting blade 20 to perform both a cutting function and a blocking or sealing function.

In an example, the chamber 18 is sized to retain the cutting blade 20 and permit movement therein, without being over-sized. This is because fluid may flow into the chamber 18 and it is desired to let as little fluid into the chamber 18 as possible.

In another example, the chamber 18 is sized to accommodate the cutting blade 20. For example, the chamber 18 may be enlarged to accommodate other structure, such as an internal block (not shown) and/or installation of driving assembly (e.g., gears, not shown) for the cutting blade 20. The size of chamber 18 may be configured based on various drive options for the cutting blade, such as but not limited to, mechanical, electrical, hydraulic, and/or pneumatic drive assemblies (e.g., gears, motors, pistons, etc.).

In an example, the cutting blade 20 may be operated by handle 22. Turning the handle 22 rotates the threaded lead screw 24 through threaded block or nut 26. The threaded block 26 serves to brace the threaded lead screw 24 and cause the cutting blade 20 move up or down within the chamber 18.

In an example, the cutting blade 20 may be tightened with sufficient downward pressure so as to cut through the pipe 1. In another example, the cutting blade 20 may be tightened to provide pressure against the outer perimeter of the pipe 1, and then the shut-off device 10 may be rotated about the pipe while continuing to apply pressure to the blade (e.g., by rotating handle 22) to cut through the pipe 1.

Cutting through the pipe 1 at least partially seals the open end in the pipe 1 that was formed by cutting the pipe 1. In an example, the cutting blade 20 seals against the open end of the pipe 1 to slow or stop fluid flow. In another example, fluid from the pipe 1 may leak or flow into the chamber 18 and is sealed within the chamber 18. As such, the shut-off device 10 slows or altogether stops fluid flow from the opening in the pipe 1.

In an example, the shut-off device 10 includes a first valve clamp 28a to secure the upper valve body 14 to the lower valve body 16. A second valve clamp 28b secures the opposite side of the shut-off device 10.

Figure 7:
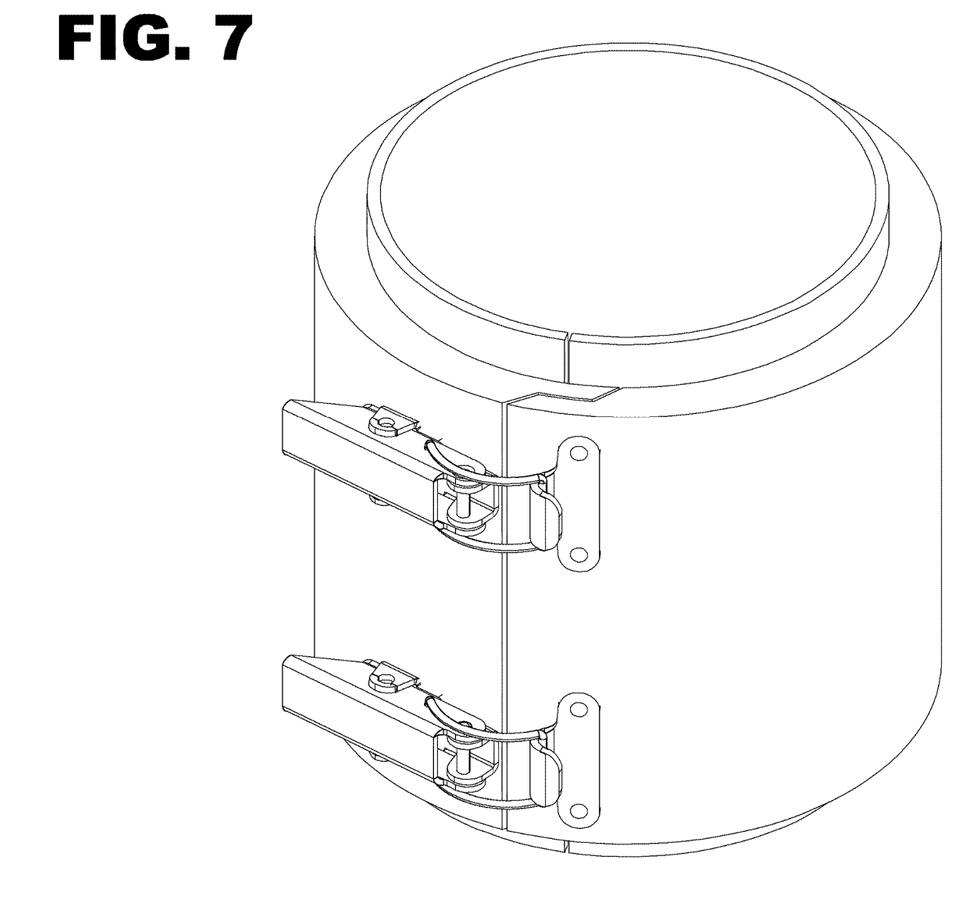
FIG. 7 is a perspective view of another example sleeve housing for a shut-off device.

A first flange bearing 30a may be provided as a seal between the first valve clamp 28a and the pipe 1. A second flange bearing 30b seals the second valve clamp 28b and the pipe 1 on the opposite side. The first and second flange bearings 28a and 28b form a sleeve housing. The first and second flange bearings 28a and 28b may have an upper portion and a lower portion so that the flange bearings can be assembled onto the pipe 1. Another example sleeve housing is shown in FIG. 7.

The example first flange bearings 28a and 28b may include a seat 32a and 32b, respectively. The seat 32a and 32b may be a rubber, gasket, or other pliable material provided on the surface that is in contact with the pipe 1, or therebetween. The seat 32a and 32b provides a seal against the pipe 1, and may also aid in retaining the shut-off device 10 in position on the pipe 1, e.g., during a cutting operation and/or after the pipe 1 is cut and pressure builds up due to the fluid being released into the chamber 18. As such, the seat 32a and 32b serves as a seal and/or as a pressure side retainer ring to prevent the section of the pipe from sliding relative to the shut-off device 10.

Although not shown, other seals (e.g., gasket, washer, or O-ring) may also be provided. An example can be seen by the end-view of O-rings 40a and 40b seen in the cross-sectional view of FIGS. 6A-6C. These seals can be readily implemented with the shut-off device 10 by one having ordinary skill in the art after becoming familiar with the teachings herein, in order to better seal the shut-off device 10 against leaks.

Figure 3:
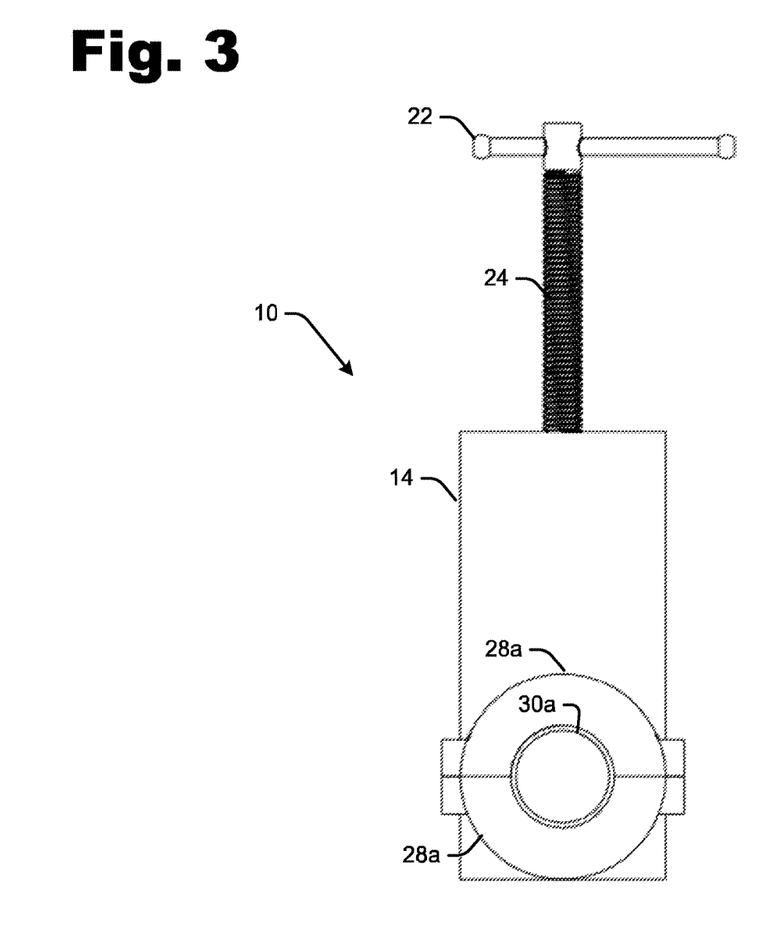
FIG. 3 is a front view of an example shut-off device.
Figure 4:
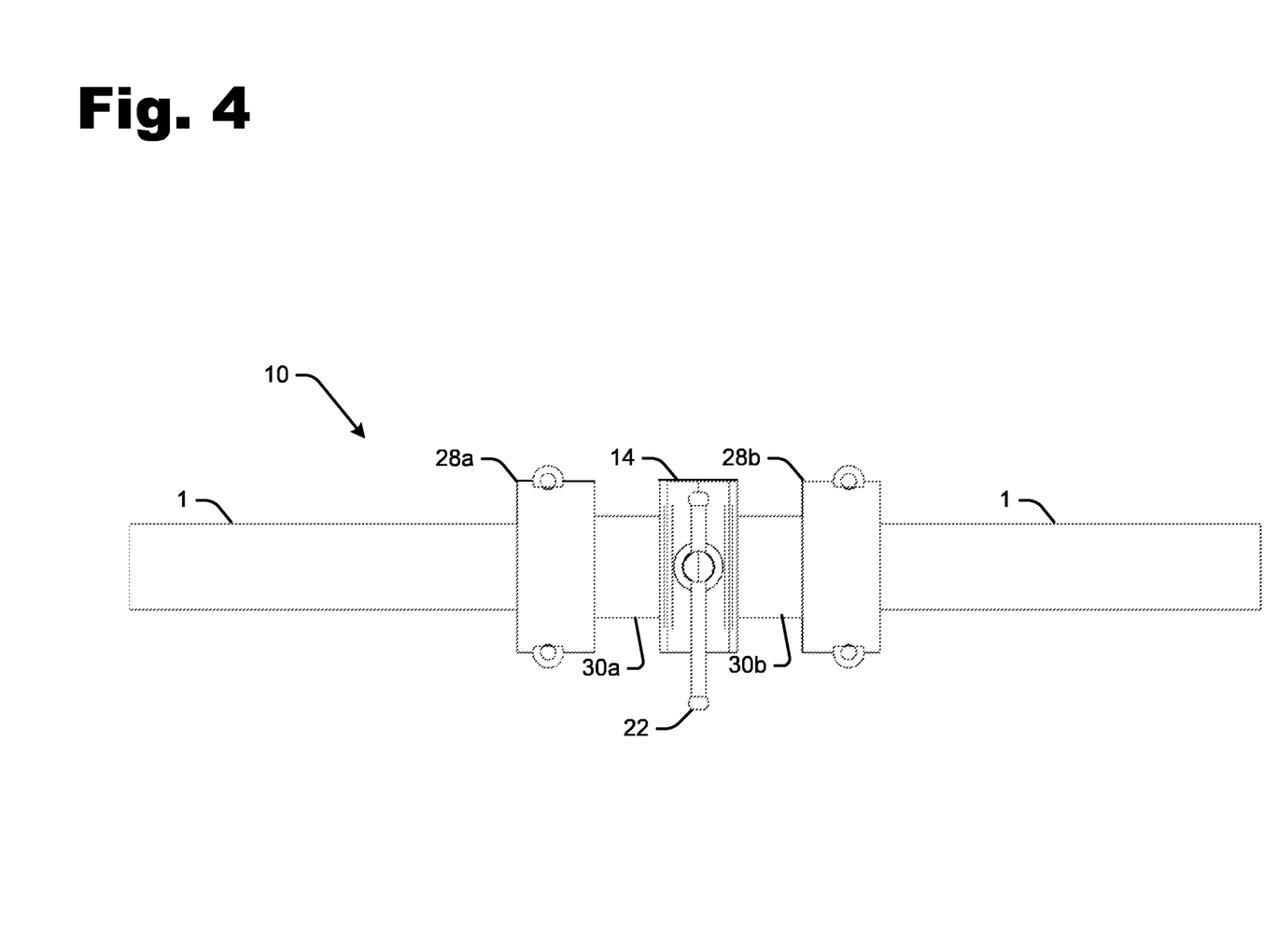
FIG. 4 is a top view of an example shut-off device.

FIG. 3 is a front view of an example shut-off device 10. FIG. 4 is a top view of an example shut-off device 10. The shut-off device 10 includes a cutting blade 20 installed in a housing. The housing may include separate portions which may be connected, e.g., by fastener (not shown) to form an integrated single unit. The "split" configuration of the housing enables the shut-off device 10 to be separated and assembled onto the pipe 1.

It is noted that the assembled components of the housing may be any size, shape, and/or other configuration. The specific configuration may be based on design consideration, such as but not limited to the size of the pipe (e.g., pipe diameter). In general, the assembled components on the pipe 1 should form a tight fit between the shut-off device 10 and the pipe 1.

Before continuing, it should be noted that the examples described above are provided for purposes of illustration, and are not intended to be limiting. Other devices and/or device configurations may be utilized to carry out the operations described herein. Various other configurations of the shut-off device 10 are also contemplated, as will be apparent to those having ordinary skill in the art after becoming familiar with the teachings herein.

By way of illustration, the shut-off device 10 may include a cutting wheel. The blade is operable to cut through the pipe (e.g., by rotating the wheel or slicing straight through with the blade) sufficiently to cut through the entire pipe and thereby shut-off flow. In an example, the entire cutting wheel, including the housing, rotates around the pipe, cutting the pipe, thereby covering the entire opening of the pipe with the gate valve (or any valve or other mechanical device), and consequently shutting off the flow.

It is noted that the assembled device may be configured based at least in part on the diameter of the pipe, e.g., to provide a tight fit while still enabling the cutting wheel to rotate about the pipe 1.

By way of further illustration, the shut-off device 10 may be configured for low-pressure environments (e.g., fluid flow within the pipe of about 50-70 psi), such as is typical in household water pipes. An example configuration includes a larger chamber 18. That is, the chamber 18 is not as tight surrounding the blade 20 as it may be in a higher pressure environment. In an example, the chamber 18 may be configured large enough to receive an internal block (not shown), which can be forced against the pipe 1 during cutting. In this embodiment, a low flow (e.g., dripping) may be observed after severing the pipe. But this typically is not expected to impact the repair work on the pipe 1.

Figure 5:
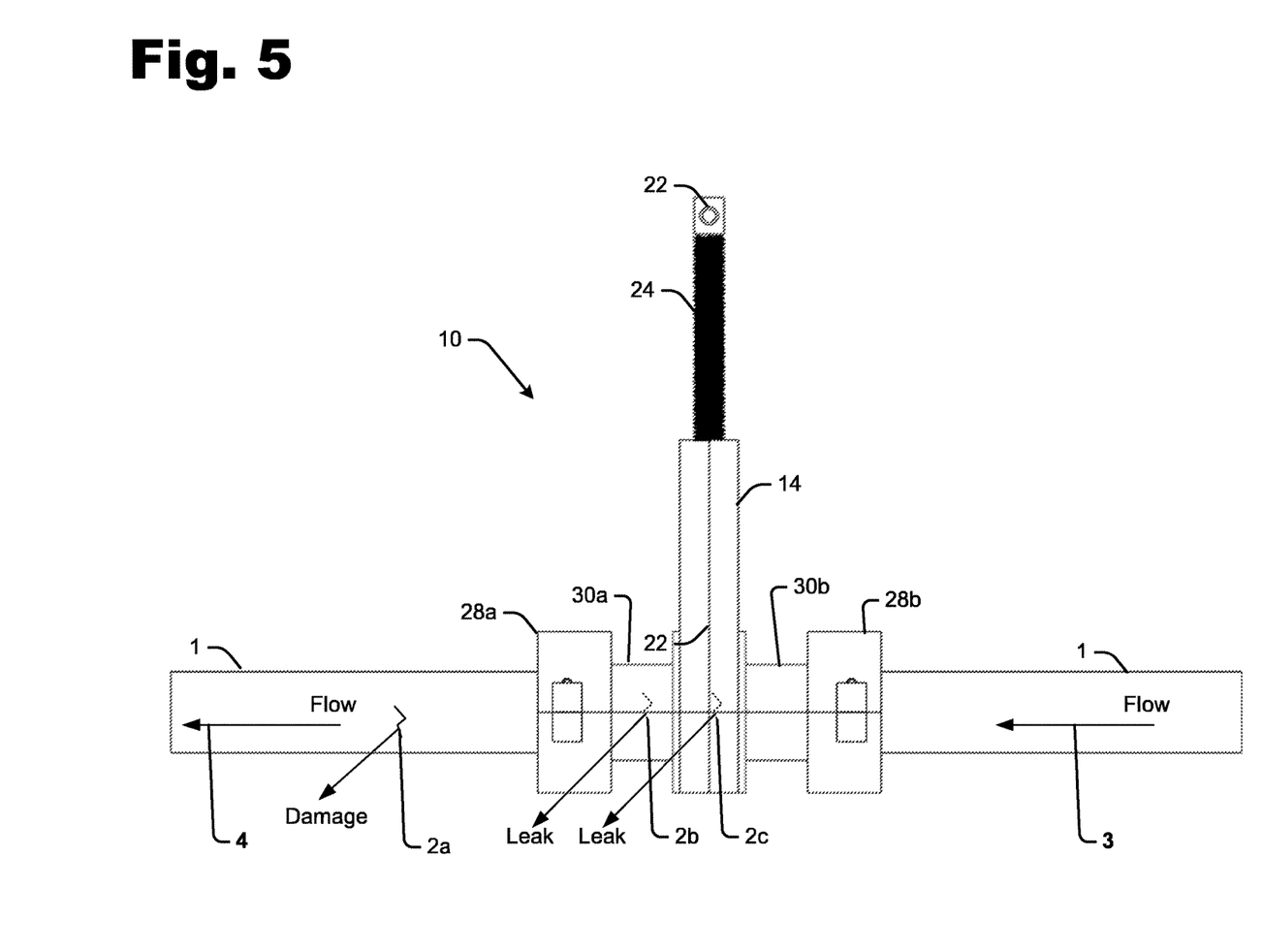
FIG. 5 is a side view of an example shut-off device.

Regardless of the specific configuration of the shut-off device 10, it may be implemented to prevent leakage at a damaged portion of the pipe 1, as shown in FIG. 5. FIG. 5 is a side view of an example shut-off device. In this example, flow is coming from a source (e.g., the city water pipes) as illustrated by arrow 3, and headed downstream (e.g., toward a sink faucet) as illustrated by arrow 4.

In an example, the shut-off device 10 can be assembled in close proximity, upstream from the damaged area 2a of the pipe 1. For example, the shut-off device 10 may be assembled in close proximity when the pipe 1 is damaged but not leaking.

In another example, where the pipe is leaking from the damaged area, the shut-off device 10 can be assembled over the damaged portion 2a of the pipe 1. That is, the first valve clamp 28a and first flange bearing 30a may cover a leak from the damaged portion 2b to stop the leak in the short term, while the cutting blade 20 is operated. After the cutting blade 20 has cut through the pipe and is blocking flow 3 (e.g., serving as an emergency gate valve), the first valve clamp 28a and first flange bearing 30a may be removed from the shut-off device 10 and the damaged portion 2b repaired.

Following stoppage (or slowing) of the leak, the sleeve housing beyond the "valve" that has been formed, may be opened independently to remove the damaged pipe so that a new pipe can be inserted and installed. This portion of the sleeve housing can then be closed again and the gate valve can be re-opened and re-closed as needed (e.g., as an emergency gate valve) to resume normal flow and to control volume and pressure of the flow in the repaired pipe. In an example, the gate valve cannot be removed and reused, thereby maintaining the integrity of the original installation.

In another example, where the pipe is not going to be repaired, the shut-off device 10 can be assembled directly over the damaged portion 2c. In this example, the damaged portion 2c of the pipe 1 remains in the body of the shut-off device 10. It may be self-sealing, internally sealed or by tightening a lever compression clamp.

In an example, the shut-off device 10 may be operated to shut flow even after all other shut-off systems (e.g., valves) have failed. In addition, the shut-off device 10 can remain in place and serve as a gate valve itself. That is, the cutting blade can be opened to permit fluid flow through the pipe 1, and closed to at least partially restrict or fully stop fluid flow through the pipe 1. These and other operations will be discussed in more detail below with reference to the illustration shown in FIGS. 6A-6C.

Figure 6A:
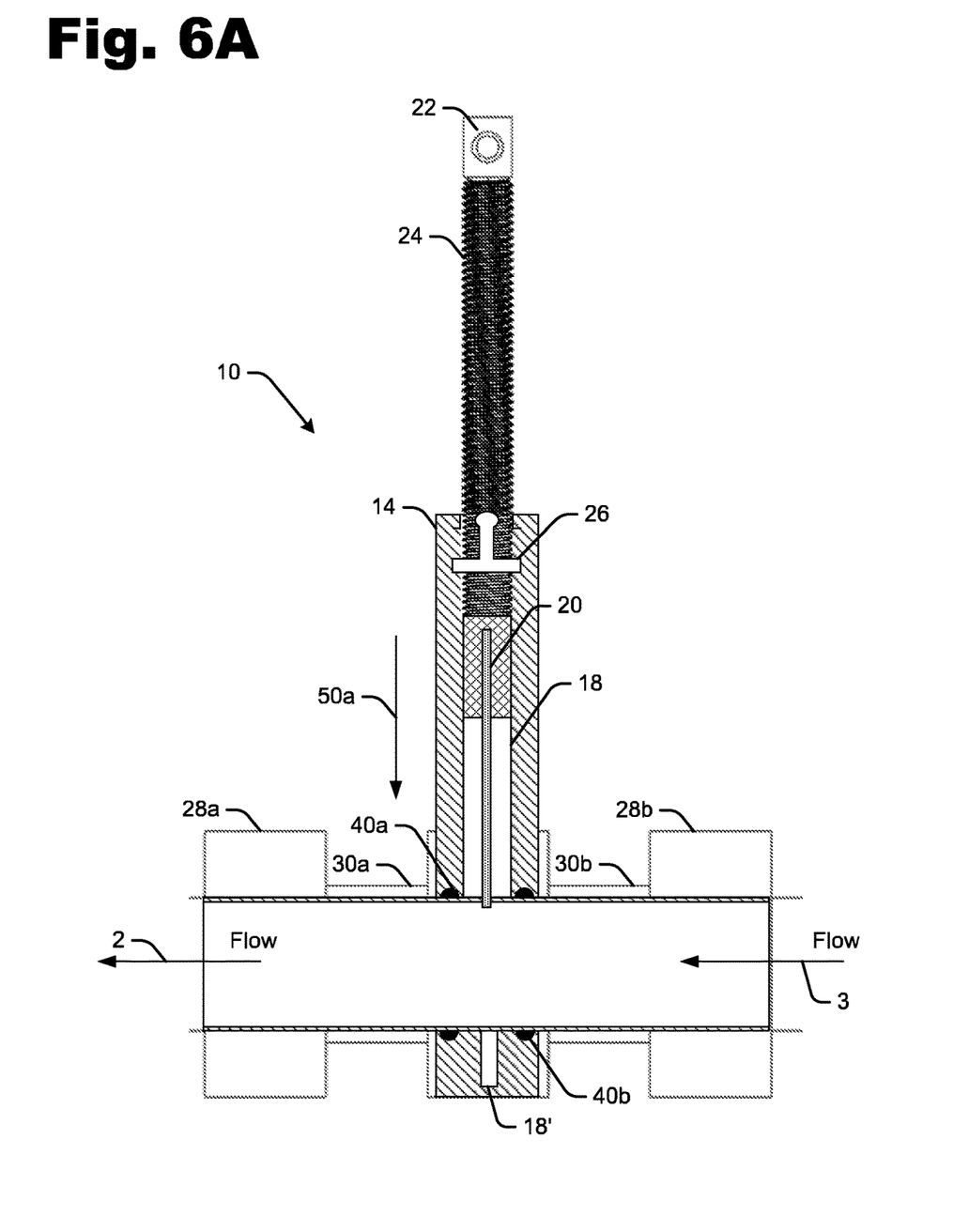
FIGS. 6A-6C are side views illustrating operation of an example shut-off device.
Figure 6B:
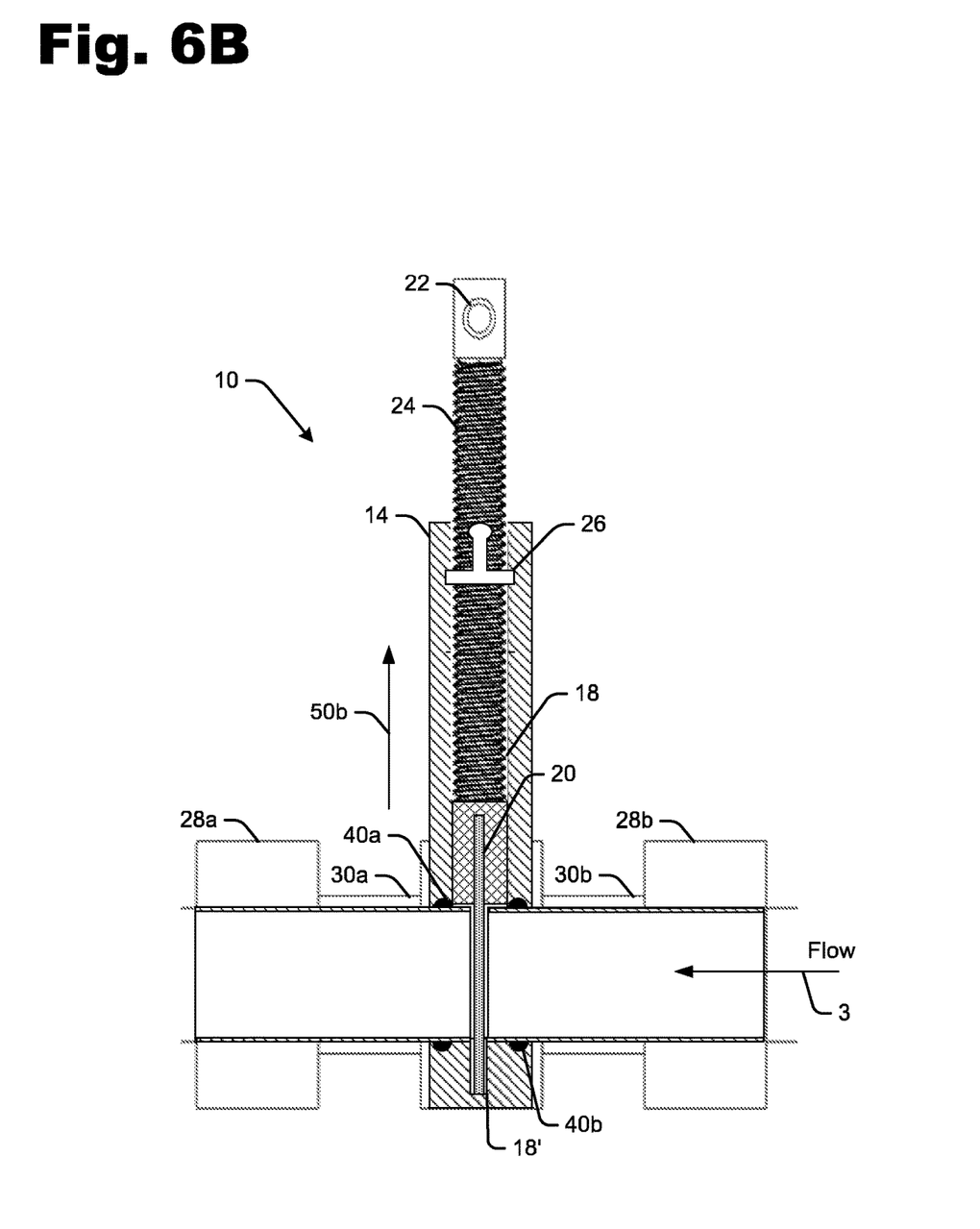
Figure 6C:
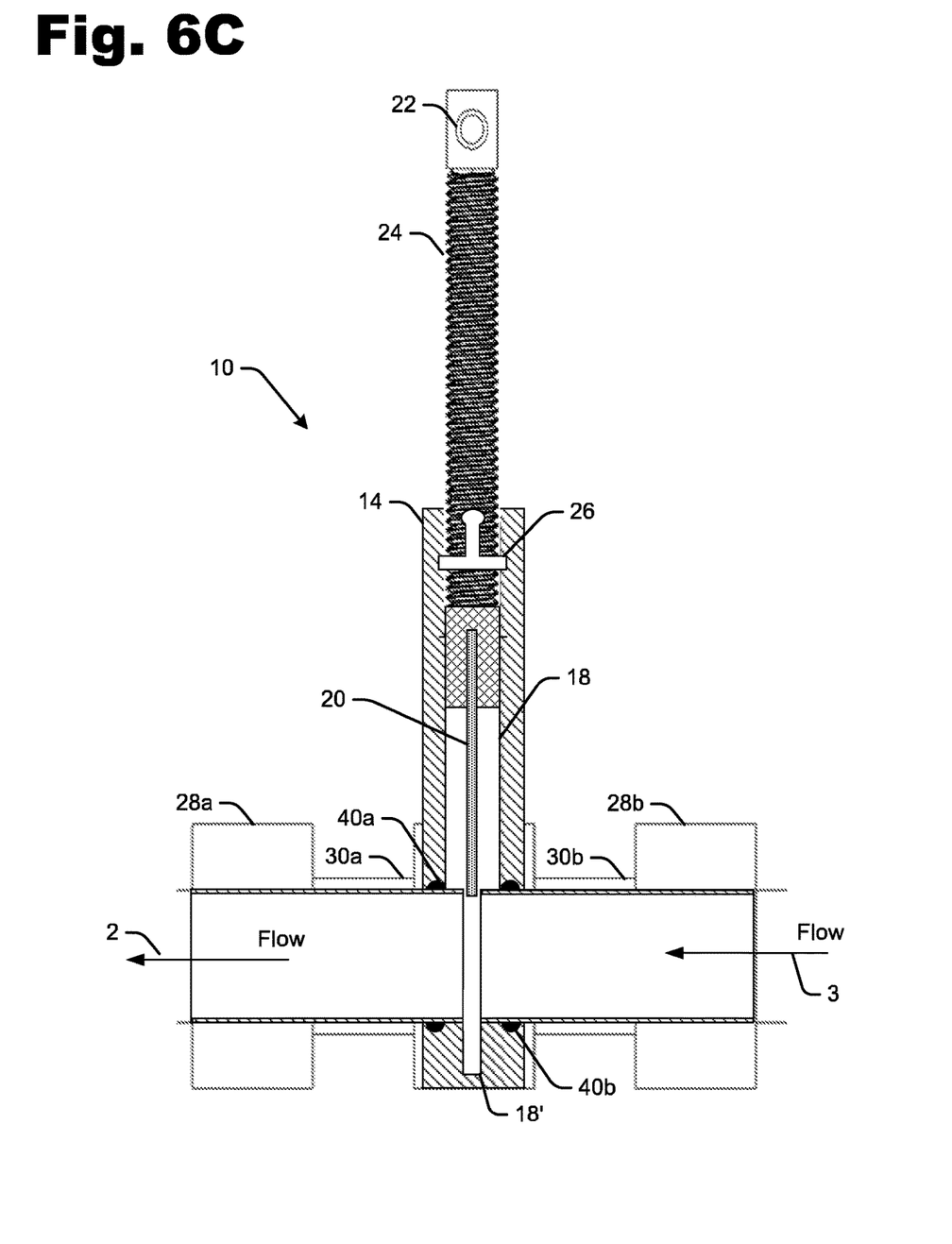

FIGS. 6A-6C are side views illustrating operation of an example shut-off device 10. In FIG. 6A, the upper and lower portions of the shut-off device 10 may be assembled around the pipe 1. In an example, the shut-off device 10 provides a stationary sleeve housing which can be wrapped around the pipe in a sealed manner. This may be achieved by either a hinged or clamp-like or other overlapping or bolted configuration, which is attached around the pipe below the failure point, to seal and retain the pipe adjacent the leak. For example, the shut-off device 10 may be bolted (or otherwise fastened) together to provide a sealing surface on the pipe sections. Seats 32a and 32b (FIG. 2) and/or retainer rings (not shown) may be provided to reduce or altogether eliminate the slide out tendency of pipe ends.

After assembling the shut-off device 10 at the desired location on the pipe 1, the cutting blade 20 may be operated to cut through the pipe 1 (e.g., either by rotation or unidirectional force through the pipe 1), and close off the opening that has been cut, as illustrated by arrow 50a. The shut-off device 10 is configured to simultaneously stop a leak (e.g., by assembling over the leak) and serve as a sealed gate valve by shutting off the flow within the pipe and prevent further leaking from the pipe 1, as illustrated when the cutting blade 20 has fully cut through the pipe 1 and seated within portion 18' of the chamber 18.

In an example, the housing sleeve on either side of the sealed gate valve is configured to be assembled independently, and can thus be removed to repair the pipe section after flow has been shut off by the cutting blade 20. That is, the shut-off device 10 fully depressurizes the damaged section of the pipe and can either seal the flow, or at least dampen flow to a minimal level that enables the valve clamp 28a and/or 28b and flange bearing 30a and/or 30b to be removed and the pipe repaired.

Following stoppage (or slowing) of the leak, the sleeve housing beyond the "valve" that has been formed, may be opened independently to remove the damaged pipe so that a new pipe can be inserted and installed. In an example, the valve clamp 28a and/or 28b and flange bearing 30a and/or 30b can then be closed again and the cutting blade 20 implemented as a gate valve. Of course, the pipe does not need to be repaired, and can remain either within the chamber 18 or sealed by the valve clamp 28a and/or 28b and flange bearing 30a and/or 30b.

The gate valve can be opened (e.g., in the direction of arrow 50b in FIG. 6B) to resume normal flow and, partially or fully closed (e.g., in the direction of arrow 50a in FIG. 6A) to control volume and pressure of the flow in the pipe 1, as illustrated in FIG. 6B (closed) and FIG. 6C (open). It is noted that the term "gate valve" is not limited to any particular type of valve, and other valves may also be implemented. In an example, the gate valve cannot be removed and reused, thereby maintaining the integrity of the original installation.

The operations shown and described herein are provided to illustrate example implementations. The operations are not limited to the ordering shown. Still other operations may also be implemented. By way of illustration, the device may be configured for use on large industrial size pipes (e.g., oil and gas pipelines). In an example, the device may be operated by robotics or as an attachment to other equipment (e.g., front loaders or large excavating machines).

FIG. 7 is a perspective view of another example sleeve housing for a shut-off device. It is noted that the sleeve housing (e.g., as shown in FIG. 7 or otherwise) may be implemented by itself. That is, the sleeve housing can be tightened around a damaged portion of a pipe to seal the pipe without anything further being implemented. In another example, the sleeve housing (e.g., as shown in FIG. 7 or otherwise) can be implemented with the cut-off housing described above. That is, the sleeve housing may be utilized to temporarily "patch" a leak until the cut-off housing can be installed and shut off the water supply.

The sleeve housing shown in FIG. 7 may be configured as a quick-release lever and/or buckle assembly. The sleeve housing can be opened and closed to provide a compression clamp. In an example, the sleeve housing includes a hardened outside (e.g., plastic or other material) and a pliable inside (e.g., rubber, foam, etc.). The sleeve housing shown in FIG. 7 may be used instead of the first and second flange bearings 28a and 28b to form a sleeve housing. The sleeve housing may be hinged on one side and clamped on the other end (e.g., about 180 degrees apart from the hinge), or clamped on both ends.

It is also noted that the clamp configuration shown in FIG. 7 may also be implemented for the valve housing (e.g., the upper valve body 14 and various components of the lower valve body 16 in FIG. 1). That is, the valve housing itself may be configured as a quick release lever/buckle compression clamp. The valve housing may be configured as a quick-release lever and/or buckle assembly. The valve housing can be opened and closed to provide a compression clamp.

In an example, the FIG. 7 compression assembly (i.e., implemented as the valve housing or the housing for the valve itself; or as a sleeve housing), has a hardened outside (e.g., plastic, metal, or other hard material) and a pliable inside (e.g. rubber, foam, etc.), and a somewhat flexible configuration. In an example, the compression assembly may be spread open just sufficiently to surround a pipe and then closed via the quick-release lever and/or buckle and/or any other suitable clamping mechanism. In another example, the compression assembly may be hinged on one side and clamped on the other end (e.g., about 180 degrees apart from the hinge), or clamped on both ends. In an example the housing may be a one-piece overlapping housing, in another example it may have the buckle and/or lever or other suitable compression closure recessed in a channel to accomplish a flush configuration.

In an example, the quick-release lever and/or buckle assembly may serve to tighten (e.g., reduce the inner diameter of the sleeve housing) about the pipe as the lever is actuated. However, any suitable clamping mechanism may be implemented, and is not limited to the quick-release lever and buckle assembly shown in FIG. 7. For example, the bolts shown in previous drawings may also be utilized, wherein tightening the bolts tightens the housing about the pipe.

In another example, the sleeve housing of FIG. 7 may be implemented by itself as a quick repair for broken pipes. This example is best implemented for low pressure flow pipes, such as the common household pipes. It could also be used as a shut-off device for small diameter pipes.

It is noted that the examples shown and described are provided for purposes of illustration and are not intended to be limiting. Still other examples are also contemplated.

The invention claimed is:

1. A shut-off device, comprising: an upper valve body; a lower valve body, the lower valve body connecting to the upper valve body to surround a section of a pipe to form a chamber therein; a first flange bearing forming a first seal; a second flange bearing forming a second seal, the second flange bearing independent from the first flange bearing and each on an opposite side of the upper and lower valve bodies, each of the first and second flange bearings held together by respective valve clamps; and a cutting blade in the chamber, the cutting blade larger than twice a diameter of the pipe, the cutting blade tightening against the pipe as the cutting blade is rotated around an outer circumference of the pipe to provide pressure against an outer perimeter of the pipe to cut through the pipe and at least partially seal an opening in the cut pipe; wherein either flange bearing can be opened separately and independently to allow insertion of new pipe sections.

2. The shut-off device of claim 1, wherein the cutting blade seals within the chamber to slow or altogether stop fluid flow within the pipe.

3. The shut-off device of claim 1, further comprising a first valve clamp over the first flange bearing to secure the upper valve body to the lower valve body.

4. The shut-off device of claim 3, wherein the first flange bearing forms the first seal between the first valve clamp and the pipe.

5. The shut-off device of claim 4, wherein the first flange bearing has an upper portion and a lower portion.

6. The shut-off device of claim 5, further comprising an arcuate shape seat in the first flange bearing to engage against the pipe, the arcuate shape seat conforming to an arcuate shape of the pipe.

7. The shut-off device of claim 3, further comprising a second valve clamp over the second flange bearing to secure the upper valve body to the lower valve body.

8. The shut-off device of claim 7, wherein the second flange bearing forms the second seal between the first valve clamp and the pipe.

9. The shut-off device of claim 8, wherein the second flange bearing has an upper portion and a lower portion.

10. The shut-off device of claim 8, further comprising a seat in the second flange bearing to engage against the pipe.

11. The shut-off device of claim 1, further comprising a lead screw to open and close the cutting blade.

12. The shut-off device of claim 1, wherein the cutting blade is a gate valve, opening to permit fluid flow through the pipe, and closing to at least partially restrict or fully stop fluid flow through the pipe.

13. A shut-off device to restrict fluid flow in a pipe, the shut-off device comprising: a body configured to surround a section of a pipe; a chamber formed within the body adjacent the section of the pipe; a first flange bearing forming a first seal; a second flange bearing forming a second seal, the second flange bearing independent from the first flange bearing and each on an opposite side of the body, each of the first and second flange bearings held together by respective valve clamps; and a cutting device operable within the chamber to cut the pipe, the cutting device larger than twice a diameter of the pipe, the cutting device tightening against the pipe as the cutting blade is rotated around an outer circumference of the pipe to provide pressure against an outer perimeter of the pipe to cut through the pipe as the cutting device is rotated around the pipe so that fluid from the cut pipe is retained against leakage within the chamber; wherein either flange bearing can be opened separately and independently to allow insertion of new pipe sections.

14. The shut-off device of claim 13, wherein the body has an upper valve body and a lower valve body.

15. The shut-off device of claim 14, further comprising a valve clamp to secure the upper valve body to the lower valve body.

16. The shut-off device of claim 15, wherein the first flange bearing and the second flange bearing each form the respective first seal and second seal between the valve clamp and the pipe on opposite sides of the cutting device.

17. The shut-off device of claim 16, further comprising an arcuate-shaped seat in at least one of the first and second flange bearings to engage against the pipe.

18. An emergency repair device for a pipe, comprising: a valve housing; a sleeve housing configured to be opened and closed around a portion of damaged pipe; a first flange bearing forming a first seal; a second flange bearing forming a second seal, the second flange bearing independent from the first flange bearing and each on an opposite side of the valve housing, each of the first and second flange bearings held together by respective valve clamps; a tightening mechanism configured to reduce an inner diameter of the sleeve to form a compression clamp against the portion of damaged pipe; and a cutting device operable within the sealed chamber to cut the pipe, the cutting device larger than twice a diameter of the damaged pipe, the cutting device tightening against the damaged pipe as the cutting blade is rotated around an outer circumference of the damaged pipe to provide pressure against an outer perimeter of the damaged pipe to cut through the damaged pipe and retain fluid against leakage within the sealed chamber; wherein the sleeve housing has a hardened outside and a pliable inside to seal a leak in the portion of damaged pipe; wherein either flange bearing can be opened separately and independently to allow insertion of new pipe sections.

19. The emergency repair device of claim 18, further comprising the valve housing with a buckle closure, the valve housing having: a cutting body configured to surround a section of the damaged pipe; a sealed chamber formed within the cutting body adjacent the section of the damaged pipe; and a handle to open and close the cutting device, thereby forming a gate valve.

20. The emergency repair device of claim 18, further comprising an upper section of the sleeve housing and a lower section of the sleeve housing, wherein the upper section of the sleeve housing and the lower section of the sleeve housing clamp around the damaged pipe by a buckle closure.

* * * * *